US010554767B2

(12) United States Patent
Hardy et al.

(10) Patent No.: US 10,554,767 B2
(45) Date of Patent: Feb. 4, 2020

(54) DISPLAYING CONTENT BASED ON PROXIMITY OF A USER DEVICE

(71) Applicant: AIRWATCH LLC, Atlanta, GA (US)

(72) Inventors: Adam Michael Hardy, Atlanta, GA (US); Santhosh Chandrashekarappa, Bangalore (IN); Lokeswar Akuthota, Bangalore (IN); Prashant Agrawal, Bhopal (IN); Dharmesh Guna, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 205 days.

(21) Appl. No.: 15/466,876

(22) Filed: Mar. 23, 2017

(65) Prior Publication Data

US 2018/0109636 A1  Apr. 19, 2018

(30) Foreign Application Priority Data

Oct. 18, 2016  (IN) .............................. 201641035553

(51) Int. Cl.
*H04L 29/06* (2006.01)
*H04L 29/08* (2006.01)

(52) U.S. Cl.
CPC ............ *H04L 67/18* (2013.01); *H04L 67/306* (2013.01)

(58) Field of Classification Search
CPC ....................................................... H04L 67/18
See application file for complete search history.

(56) References Cited

U.S. PATENT DOCUMENTS

2016/0182613 A1* 6/2016 Brune .................... H04L 67/10
709/217

* cited by examiner

*Primary Examiner* — Adnan M Mirza
(74) *Attorney, Agent, or Firm* — Clayton, McKay & Bailey, PC (57) ABSTRACT

Systems and methods are included for displaying enterprise content on a large-format display based on proximity of one or more user devices. A management server can enroll a television and a user device and install management agents on both. The management server can receive proximity information from the television or the user device, or both, and determine that content relating to the user device should be displayed on the television. For example, the management server or management agents can compare an estimated distance between the television and user device to a threshold distance for displaying content on the television related to that user device. The management server can then request content from a content server and instruct the content server to provide that content directly to the television for display.

16 Claims, 6 Drawing Sheets

DISPLAYING CONTENT BASED ON PROXIMITY OF A USER DEVICE

RELATED APPLICATIONS

Benefit is claimed under 35 U.S.C. 119(a)-(d) to Foreign Application Serial No. 201641035553 filed in India entitled "DISPLAYING CONTENT BASED ON PROXIMITY OF A USER DEVICE", on Oct. 18, 2016, by AIRWATCH LLC., which is herein incorporated in its entirety by reference for all purposes.

BACKGROUND

Modern commercial spaces, such as offices, typically include numerous televisions or other large-format displays throughout the space. Common locations include conference rooms, break rooms, cafeterias, and lobbies. However, these displays are rarely utilized effectively. Instead, they typically either display a static image, a rotation of static images, or a repeating video.

Televisions, set-top boxes, and large-format displays (referred to collectively as "televisions" throughout) normally require substantial effort to operate. For example, an office with numerous televisions can require an administrator to individually load a display program onto each television, and to revise each individual program whenever a change is desired. The administrator may even need to physically plug a computing device into each television to load the new display program. For large spaces with many televisions—some of which may have different requirements for loading content—this task can be overly burdensome.

While current television systems fall short on providing easy-to-use setups in commercial environments, they also fall short on providing interactive information to people in nearby proximity to the television. In fact, televisions generally do not account for nearby individuals in any meaningful way. As employees gain more access to enterprise information through their phones, tablets, and laptops (referred to collectively as "user devices" herein), they will expect to be able to utilize this information across other devices, such as televisions, in a seamless manner.

As a result, a need exists for providing administrators with the ability to control multiple televisions from a single portal, as part of an overall enterprise mobility management ("EMM") system. Additionally, a need exists for automatically displaying relevant content on a television based on a person's proximity.

SUMMARY

Examples described herein include systems and methods for displaying enterprise content on a large-format display based on proximity of a user device.

In one example, a system is provided for displaying contextual enterprise content on a television based on proximity to a user device. The example system can include a content server that stores enterprise content and a management server that performs various stages for displaying contextual content. The management server can include a processor that execute instructions on a non-transitory, computer-readable medium.

The stages carried out by the management server can include enrolling the television with the management server. The enrollment process can be carried out automatically in some examples. Enrollment can include, for example, confirming compliance of the television. As part of the enrollment process, the management server can cause a first management agent to be installed on the television.

The management server can similarly enroll a first user device. Enrollment of the first user device can occur prior to, or after, enrollment of the television. Enrollment can include, for example, confirming compliance of the first user device and requesting credentials from the user. As part of the enrollment process, the management server can cause a second management agent to be installed on the first user device.

The management server can receive proximity information from the television or the first user device, or both. Proximity information can include any information relating to the position, such as geographic location, of the television or first user device relative to one another, or relative to another component such as a beacon or wireless interact router. The management server can analyze the proximity information to determine whether the television and first user device are within a threshold physical distance from one another. For example, the management server can triangulate the position of a user device or television based on detected signals from wireless interact receivers in the user device or television. In another example, the management server can detect a distance based on BLUETOOTH communications exchanged between the user device and television, or between those devices and a beacon.

If the television and first user device are within the threshold physical distance of one another, the management server can request enterprise content from the content server. The requested content can be based on the first user device—for example, content related to a calendar meeting saved on the first user device, a presentation stored on the first user device, or a presentation stored in a cloud storage but associated with the user of the first user device.

The management server can also cause the requested enterprise content to be sent to the television for display. For example, the management server can instruct the content server, either at the time or beforehand, to deliver requested content to the television. The management server can pass any necessary information to the content server in order to allow the content server to locate and send the content to the television. The content server can include a content database that stores content in a searchable format.

The example system is not limited to a single user device. For example, the management server can enroll a second user device and cause a management agent to be installed on that device as well. The management agent can then receive proximity information from at least of the of the television, first user device, or second user device, or from a combination thereof. The proximity information can indicate that the television, first user device, and second user device are within a threshold physical distance from one another. More particularly, the proximity information can indicate that the first and second user devices are within a threshold physical distance from the television or a beacon associated with the television.

Based on the proximity information, the management server can request content from the content server based on the first or second user devices, or both, and cause the content to be sent to the television for display. For example, the management server can determine, based on the proximity information, which of the first and second user devices is closer to the television, and request content based on the closer user device.

In order to provide a user with appropriate levels of privacy, the system can implement controls that influence the information that is allowed to be shared to a television.

In a more privacy-focused setting, a user device can be prompted with a request to authorize sharing to a television. The user can provide consent before the content is displayed on the television. In a less restrictive setting, a user can flag certain content to be shared—or not shared—on televisions. Additional controls can be made available, as discussed more herein.

In another example, a method is provided for displaying contextual enterprise content on a television based on proximity to a user device. The example method can include enrolling the television and user device with a management server. In particular, the television can be enrolled with the management server and the management server can cause a first management agent to be installed on the television. Similarly, the user device can be enrolled with the management server and the management server can cause a second management agent to be installed on the user device.

The example method can also include receiving proximity information from at least one of the television and the first user device. The proximity information can relate to the position of television or first user device relative to one another, or relative to another component such as a beacon or wireless internet router. The management server can analyze the proximity information to determine whether the television and first user device are within a threshold physical distance from one another.

The example method can also include requesting enterprise content from a content server based on the first user device. For example, the management server can send a request for content to the content server. The management server can also provide instructions causing the requested enterprise content to be sent to the television for display. For example, the management server can instruct the content server to deliver the content directly to the user device.

In another example, a non-transitory, computer-readable medium is provided. The computer-readable medium can contain instructions that, when executed by a processor of a management server, performs stages for displaying contextual enterprise content based on proximity. These stages can include, for example, enrolling a television at the management server and causing a first management agent to be installed on the television, and similarly enrolling a user device at the management server and causing a second management agent to be installed on the user device.

At another stage, the management server can receive proximity information from at least one of the television and the first user device. The proximity information can relate to the position of the television or first user device relative to one another, or relative to another component such as a beacon or wireless internet router. The management server can analyze the proximity information to determine whether the television and first user device are within a threshold physical distance from one another.

At yet another stage, the management server can request enterprise content from content server based on the first user device. For example, the management server can send a request for content to the content server. The management server can also provide instructions causing the requested enterprise content to be sent to the television for display. For example, the management server can instruct the content server to deliver the content directly to the user device.

Both the foregoing general description and the following detailed description are exemplary and explanatory only and are not restrictive of the examples, as claimed.

DESCRIPTION OF THE EXAMPLES

Reference will now be made in detail to die present examples, including examples illustrated in the accompanying drawings. Wherever possible, the same reference numbers will be used throughout the drawings to refer to the same or like parts.

Systems and methods are provided for displaying enterprise content on a large-format display based on proximity of one or more user devices. A management server can enroll a television and install a management agent on the television, allowing for centralized control of the television by the management server. The management server can similarly enroll a user device and install a management agent on the device. Either, or both, of the management agents installed on the television and user device are capable of sending proximity information to the management server.

For example, the television can detect the proximity of a user device by sensing a BLUETOOTH signal (such as BLUETOOTH LOW ENERGY or BLE) from the user device. The television can notify the management server of this proximity by sending a communication to the management server including proximity information. Likewise, the user device can detect the proximity of the television and notify the management server in a similar a manner. In other examples, the television and user device can provide proximity information to the management server that includes information regarding the proximity of a beacon from the television or user device, respectively. Other types of proximity information can be provided to the management server as well.

The management server can determine, based on the proximity information, when enterprise content should be displayed on the television. For example, the management serer can compare an estimated distance between the television and user device to a threshold distance for displaying content on the television related to that user device. The management server can then request content from a content server and instruct the content server to provide that content directly to the television for display.

Figure 1:
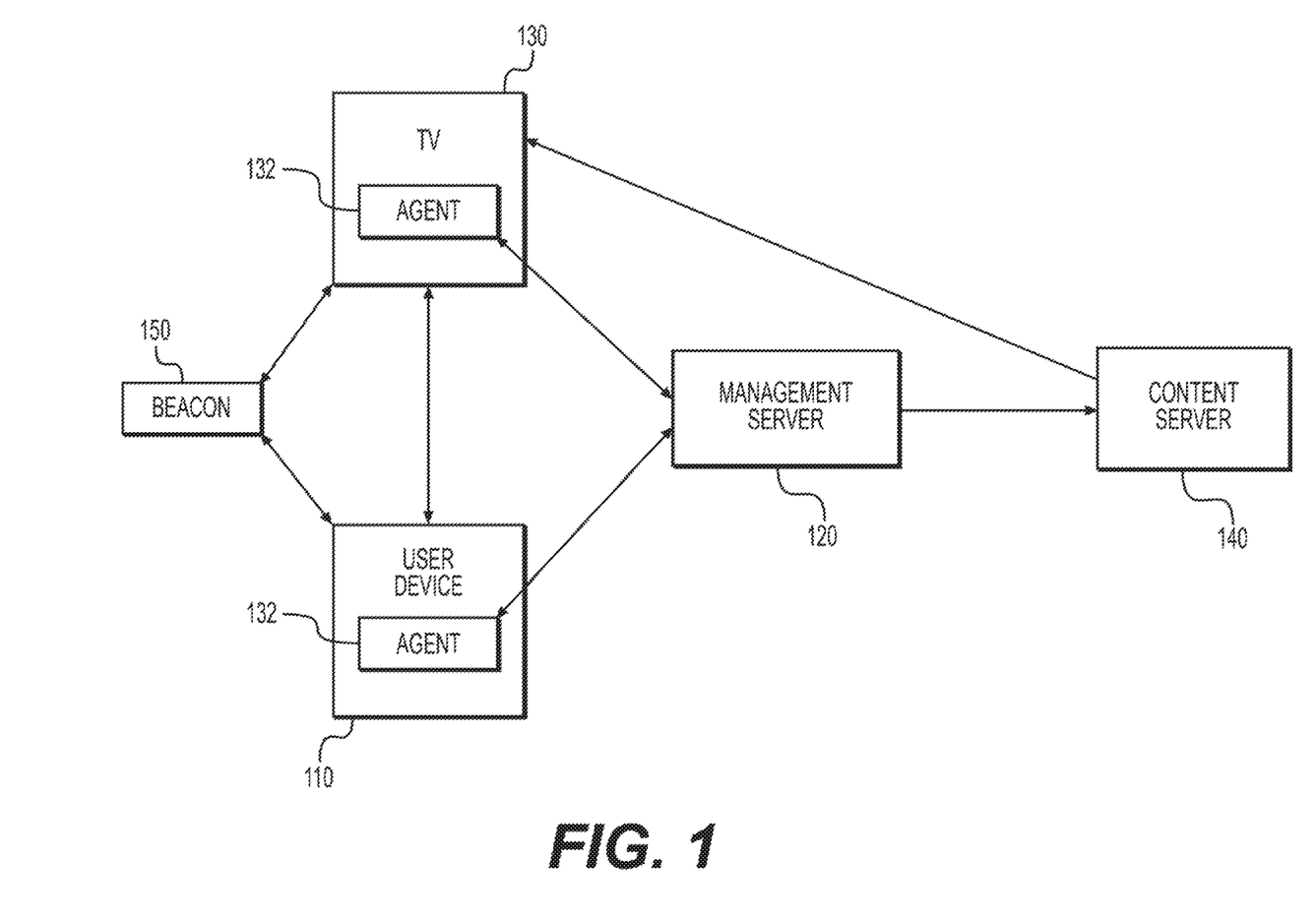
FIG. 1 is an exemplary illustration of system components for displaying contextual enterprise content based on proximity.

Turning to FIG. 1, an illustration of system components of an example system is provided for displaying enterprise content on a television 130 based on proximity of a user device 110. Although the words "television" and "TV" are used to describe element 130 in FIG. 1, these terms are intended to cover a wide spectrum of devices. For example, "television" or "TV" can refer to any large-format display, including televisions and computer monitors, or to set-top boxes or other control devices that feed input to a television, such as an APPLE TV, ROKU, audio/video receiver, laptop, or any other type of computing device. A user device 110 can include any computing device, such as a cell phone, laptop, tablet, personal computer, workstation, hand-held scanner, card reader, or register. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device," "device," "user devices," and "devices" are used interchangeably, as appropriate.

The user device 110 and television 130 can each separately enroll with a management server 120—for example, as part of an overall EMM or Mobile Device Management ("MDM") system. The EMM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein.

The management server 120 can monitor and manage the operation of user devices 110 and televisions 130 through the management server 120 itself, or more specifically, through a management service or program executing on the management server 120. Although one user device 110 and one television 130 are shown, the management server 120 can monitor and manage the operation of multiple user devices 110 and televisions 130 enrolled in an EMM system. The management server 120 can also provide access to email, calendar data, contact information, and other enterprise resources to enrolled user devices 110 or televisions 130. A system administrator can have privileges associated with managing, editing, revising, and otherwise administrating functions associated with the management server 120.

The management server 120 can include components for enrolling the user device 110 and television 130 and confirming compliance. These features will be discussed in more detail below. As part of the enrollment process, the management server 120 can cause management agents 132 to be installed on each enrolled user device 110 and television 130. The management agent 132 can be a portion of an operating system for the user device 110 or television 130, or it can operate in the application layer of the user device 110 or television 130. For example, the management agent 132 can be a dedicated application or other software installed on the user device 110 or television 130 that can monitor and manage data, software components, and hardware components associated with the user device 110 or television 130, respectively. The management agent 132 can monitor and control functionality and other managed applications on the user device 110 or television 130 as well.

The management agent 132 can be an application, or portion of an application, that provides functionality beyond simply monitoring and managing resources in the user device 110 or television 130. In one example, a developer can use a software development kit ("SDK") to insert, for example, security libraries into the application that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in a user device 110 or television 130. For example, if a security library provides the ability to monitor and enable or disable functionality provided by an application, the management agent 132 can call functions provided by the library to monitor and enable or disable the functionality.

The management agents 132 installed on the television 130 and user device 110 can be utilized to communicate proximity information to the management server 120. Proximity information can include a wide variety of information relating to the physical location of the user device 110 and television 130. In one example, the user device 110 and television 130 include near-field-communication ("NFC") components, such as a BLUETOOTH transmitter and receiver. The respective NFC components of the user device 110 and television 130 can detect one another, generating proximity information. The proximity information can include the type of NFC component detected, the time of detection, the duration of detection, the physical distance between the respective NFC components, and any other relevant information. The proximity information can be provided to the respective management agents 132 installed on the user device 110 and television 130.

In another example, proximity information can be generated based on interaction between the user device 110 or television 130 and an independent NFC component. FIG. 1 shows an example independent NFC component as beacon 150. Beacon 150 can include any type of hardware independent from the user device 110 or television 130 that is capable of broadcasting NFC signals. For example, a beacon 150 can the located in a conference room near the television 130. The management server 120 can be configured such that the beacon 150 near the television 130 is associated with that television 130. The management agent 132 of the user device 110 can collect proximity information based on detecting the beacon 150. For example, the management agent 132 of the user device 110 can collect information regarding the type of beacon 150 detected, the time of detection, the duration of detection, the physical distance between the user device 110 and the beacon 150, and any other relevant information. This proximity information can be provided to the management server 120 by the management agent 132.

In another example, proximity information can include information related to wireless internet components. Modern user devices 110 and televisions 130 have the ability to connect to a wireless internet router using a wireless internet component. When powered on, wireless internet components, such as those in a user device 110 or television 130, can be detected by a wireless internet router or other detection devices. When multiple detection devices detect a wireless internet component, the location of the wireless internet component can be calculated. For example, a common technique for calculating the position of a wireless internet component is to use a WI-FI Positioning System, which triangulates the location of a wireless internet component. Other techniques may be used as well. Proximity information relating to detecting wireless internet components of the user device 110 or television 130 can be delivered to the management server 120 via the respective management agents 132.

Proximity information generated by the user device 110 or television 130 can be transmitted to the management server 120 for processing. The management server 120 can determine what actions to take, if any, based on the proximity information. More specifically, the management server 120 can be configured with one or more content rules that delineate or more courses of actions based on proximity information. For example, a content rule can specify that a particular television 130 in a conference room should show relevant content when a user device 110 is within three feet of the television 130. Any distance can be included in the content rule, and can be adjusted based on the type of television 130 and its location. For example, a television 130 in a cafeteria can be associated with a content rule that specifies content sharing when a user device 110 is within ten feet, rather than three feet. Along the same lines, a television 130, such as a set-top box on a conference table, can be associated with a content rule that specifies content sharing when a user device 110 is within one foot.

A content rule can also determine the type of content to be displayed on a television 130. For a television 130 in a conference room, for example, a content rule can specify that the television 130 should display enterprise content relevant to the meeting taking place in the conference room at the time. As an example, if the conference room was currently in use for an accounting meeting, a content rule could specify that if a device 110 is within a threshold proximity of the television 130, accounting content associated with that device 110 and relevant to a meeting in a conference room should be displayed on the television 130. The management server 120 can provide enterprise information associated with the meeting to assist in carrying out the content rule. For example, because the user device 110 is enrolled with the management server 120, information regarding the user associated with the device 110, such as the user's calendar information, can be accessed by the management server 120. If the user has a meeting scheduled in their calendar, the management server 120 can access that information to determine the time, date, and location of the meeting. Similarly, if the enterprise has an online booking service for meeting rooms, the management server 120 can connect to the service to determine information about scheduled meetings. For example, the management server 120 and user device 110 can be integrated with MICROSOFT ACTIVE DIRECTORY such that the management server 120 can access any information associated with the user device that is available to ACTIVE DIRECTORY.

FIG. 1 shows a content server 140 that can be used to deliver relevant content to a television 130. In some examples, the content server 140 is a network of servers, some of which can be located remotely from one another. In another example, the content server 140 is a single server with multiple purposes. In yet another example, the content server 140 can be one or more servers dedicated to the operations described herein. The content server 140 can also include a content database. The content database can be a partition of the content server 140, an independent server, or any of type of storage device. The term "content server" is intended to encompass any number of content servers and content databases.

As shown in FIG. 1, the management server 120 can communicate directly with the content server 140 to cause the requested content to be sent from the content server 140 to the television 130. In one example, the management server 120 sends the proximity information to the content server 140, and the content server 140 applies any relevant content rules to determine whether to deliver content, and if so, what content to deliver. In another example, the management server 120 applies relevant content rules and provides any resulting instructions to the content server 140. In yet another example, both the management server 120 and content server 140 apply content rules in determining what content to send to the television 130.

Although FIG. 1 shows the management server 120 communicating directly with the content server 140, the respective management agent 132 of the user device 110 or television 130 (or both) can also communicate directly with the content server 440. In that example, the content server 140 can perform any operations relevant to determining proximity or content, including those operations previously described as being handled by the management server 120. In other words, the functions of the management server 120 and content server 140, as they relate to determining proximity and delivering content, can be performed by either the management server 120, the content server 140, or a combination of both.

The content stored on the content server 140 can include any type of enterprise content. Enterprise content can include, for example, email content, calendar content, document storage content, messaging content, and any other type of content associated with an enterprise program, application, or system. Email content, for example, can include content such as email bodies, headers, sender, recipient(s), and any other type of metadata associated with emails. Calendar content can include content associated with scheduled meetings, appointments, notes, or any other type of metadata associated with a calendar application. Document storage content can include content associated with documents stored in an enterprise storage location, including text documents, photos, presentations, projects, or any other file type associated with an enterprise application. Messaging content can include any content associated with messages sent or received by a user, including instant messages, SMS, MMS, or social-media messages. In some examples, enterprise content can also include advertising content. Advertising content can be stored on an advertising server that contains content approved for use at enterprise locations. For example, an advertising server can include advertising content from companies that are partnered with the enterprise, or have paid the enterprise for advertising purposes.

The content server 140 can select appropriate content based on one or more content rules. Content rules can be created by an administrator at a console operatively connected to the management server 120, which delivers the content rules to the content server 140 with instructions to carry out the content rules. Content rules can be specific to particular televisions 130 or user devices 110, or can apply across multiple televisions 130 or user devices 110. Content rules can also be geographically based such that different content rules apply to televisions 130 or user devices 110 based on their location, such as their location within an office building.

In one example, a content rule specifies that a television 130 located in a conference should display content relevant to meetings whenever a user device 110 is within five feet of the television 130. The content rule can further specify that content relevant to meetings includes presentations associated with a calendar invitation for that meeting, such as an attachment to the meeting invitation. When a user device 110 enters the five-foot proximity of the television 130, the management agents 132 of the user device 110 and television 130 can send proximity information to the management server 120, which in turn instructs the content server 140 to enforce a content rule and deliver relevant content to the television 130. The content server 140 can search the content database for any presentations attached to a calendar invitation and send that presentation to the television 130 for display. If the calendar invitation does not have an attachment, the content server 140 can search for relevant email attachments or documents that include metadata related to metadata associated with the meeting invitation, for example.

In another example, proximity is determined by the management agents 132 of the user device 110 and television 130. The management agents 132 can have content rules that are set in advance by the management server 120. The content rules can include threshold distances between devices used for triggering content display, and can also govern the type of content displayed. In one example, the content rule includes the television 130 determining the closest user device 110 within a threshold distance. The management agents 132 can be configured to communicate with one another so that the television 130 or user device 110 can determine their proximity to one another based on localized communications, such as BLUETOOTH. This can allow the user device 110 and television 130 to determine proximity without contacting the management server 120.

If a threshold proximity condition is met, the television 130 or user device 110 can contact the management server 120 to request relevant content associated with the user device 110 to display. In another example, the user device 110 can have already determined the relevant content and can provide it to the television 130 over the localized communications. The management agent 132 of the user device 110 can have requested relevant content in advance, and it can be locally stored and available on the user device 110. Alternatively, the user can flag relevant content, as will be discussed below. This can allow the user device 110 to broadcast relevant content on the television 130 without having to contact the management server 120, in an example.

In some examples, the management server 120 or content server 140 can request permission from a user before displaying content on a television 130. For example, the management server 120 can prompt the user to allow the content server 140 to search for content and display it on the television 130. In another example, the content server 140 can search for content, send it to the user device 110 for display, and prompt the user to allow that content to be displayed on the television 130. If the user agrees, the content server 140 or user device 110 can send the content to the television 130. In yet another example, the content server 140 can search for content and send a preview to the user device 110 for display, and then prompt the user to allow the content associated with that preview to be displayed on the television 130.

In other examples, flags can be utilized by a user to indicate content that is available, or not available, for displaying on a television 130. In the former example, a user can flag content items to indicate that the items are available for displaying on a television 130. For example, the user can flag a presentation before a meting in a conference room. The content server 140 can confirm that selected content has been flagged by the user before sending the content to a television 130 for display. In an alternate example, the user can flag content that should not be made available for displaying on a television 130. For example, the user can flag a confidential conversation about a topic to be discussed at a meeting. The content server 140 can confirm that any content to be sent to a television 130 in the conference room is not flagged, and therefore allowed to be delivered to the television 130.

As mentioned above, the management server 120 can include components for enrolling the user device 110 and television 130 and confirming compliance. These components can include, for example, an enrollment component that enrolls user devices 110 and televisions 130 with the management server 120, an administrator component that provides administrative access to enterprise management, organizational groups that define particular groups for user devices 110 and televisions 130, compliance rules that define rules and corresponding remedial actions for user devices 110 and televisions 130, and management policies that provide permissions or enable particular functionalities for user devices 110 and televisions 130.

With respect to enrollment, the management server 120 can include an enrollment component and an administrator component, either or both of which can be used for the process of enrolling a user device 110 or television 130. For example, the user device 110 or television 130 can communicate with the enrollment component during the initial stages of enrollment. In some examples, the enrollment component can provide a token to the user device 110 or television 130 indicating that the user device 110 has been authenticated and is permitted to communicate and enroll with the management server 120. In some examples, a television 130 can be loaded with authentication information such that it can automatically with the management server 120 without any further input.

In some examples, the administrator component can request a token from the user device 110, indicating that the user device 110 has been authenticated and is permitted to continue the enrollment process with the administrator component. Upon receiving the token, the administrator component can continue the enrollment process. The administrator component can also provide a console for an administrator to configure and monitor the status of the user device 110 and the enrollment process. In some examples, the administrator component can be dedicated to a particular enterprise or group of enterprises, while the enrollment component can be shared across multiple different enterprises. Similar tokens can be installed, such as during enrollment, to allow the management agents 132 of the television 130 and user device 110 to communicate with one another.

An administrator can also use a console connected to the management server 120 to turn one or more televisions 130 on or off. For example, the administrator can select a particular television 130 through the console and manually turn that television 130 on or off. In another example, the administrator can select a group of televisions 130 or even all managed televisions 130, and turn that selection of televisions 130 on or off. Finally, an administrator can establish a rule that automatically turns television 130 on or off. The rule can apply to specific televisions 130, groups of televisions 130, or all of the managed televisions 130. The rule can specify, for example, that the selected televisions 130 are to turn on at 7:30 AM and turn off at 8:00 PM on weekdays. On weekends, the rule can specify that televisions 130 remain off unless manually turned on.

An administrator can also utilize a console of the management server 120 to perform automatic enrollment for a television 130. In one example, the television 130 to be enrolled is first registered by the administrator. The console can then generate a token based on the registration details and synchronize the token to an auto-discovery server. With a single click from a user at the television 130, the management agent 132 of the television 130 can send a request to the auto-discovery server, which responds with enrollment data and a token that can be used to enroll the television 130 at the management server 120. In some examples, during this enrollment process a keyed-hash message authentication code ("HMAC") token can be provided by the management server 120 to the management agent 132. The HMAC token can be stored by the management 132 and used to communicate directly with the management server 120.

In addition to the enrollment component and administrator component described above, the management server 120 can include one or more organizational groups. Organizational groups can be used by the management server 120 to apply content rules, compliance rules, or management policies to particular groups of user devices 110 or televisions 130. An organizational group can include data representing a group of user devices 110 or televisions 130 managed by the management server 120. An organizational group can correspond to a structure or hierarchy of a business or enterprise. For example, an enterprise can have various groups such as an engineering team, an accounting team, and a marketing team. Each of these teams can correspond to an organizational group stored on the management server 120. Similarly, groups of televisions 130 can belong to organizational groups based on their location or intended purpose in the enterprise.

The management server 120 can also include compliance rules. A compliance rule can set forth one or more conditions that must be satisfied in order for a user device 110 or television 130 to be deemed compliant. If compliance is broken, the management server 120 can take steps to control access of the user device 110 or television 130 to enterprise files, applications, and email. Compliance rules can be assigned differently to the different organizational groups. For example, a developer group can be assigned different compliance rules than an executive group. The executive group might be allowed to install different applications than the development group. Similarly, a conference-room group of televisions 130 can be allowed to display different content than a public-space group of televisions 130. The management server 120 can also assign different compliance rules based on the different location-based organizational groups.

Compliance rules can be used to enforce security measures with respect to the televisions 130. For example, a compliance rule can specify that a user device 110 must be in compliance to be considered a candidate for causing content to be displayed on a television 130. In another example, a compliance rule can specify blacklisted applications that, if present on a user device 110, prevent that user device 110 from causing content to be displayed on a television 130. The management server 120 can check compliance each time a user device 110 enters a proximity of a television 130, such that a user device 110 that recently became incompliant would not be allowed to cause content to be displayed.

In addition, a content rule can specify that no personal information can be displayed on a television 130 located in a public space. For example, a user's calendar reminder about a doctor's appointment should not be displayed on a television 130. The management server 120 or content server 140, or both, can make a determination as to whether content is personal in nature. The content can be parsed such that key words are compared against a directory of personal terms. For example, if the content includes terms such as "doctor," "dentist," "dr.," "blood test," "blood work," and other medical-related terms, this content would not be displayed. Similarly, personal content such as phone numbers, social security numbers, information about family members, and personal photos would not be displayed as a result of a similar content rule.

The determination of whether a user device 110 or television 130 is compliant can be made by the management server 120, the user device 110 or television 130, or a combination thereof. For example, the respective management agents 132 on the user device 110 and television 130 can generate a data object that describes the state of the user device 110 or television 130, including any settings, parameters, applications, or other information regarding the states of those devices. The data object can be analyzed by the management server 120 or management agents 132 to determine whether the user device 110 or television 130 is in compliance with the relevant compliance rules.

In some examples, a compliance rule can specific one or more conditions. If a condition occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions. In the case of a television 130, the management server 120 can cut off access to content from the content server 140 based on the television 130 being out of compliance.

A management policy can specify that a user device 110 has permission to perform or access certain functionality. For example, the user device 110 can be restricted to certain enterprise repositories and functions within applications. Similarly, a television 130 can be restricted such that it is only permitted to receive certain types of content from the content server 140. In one example, the management policy applies to an organizational group, with which the user device 110 or television 130 is associated. The organizational group can change over time and include different user devices 110 or televisions 130 over time.

Figure 2A:
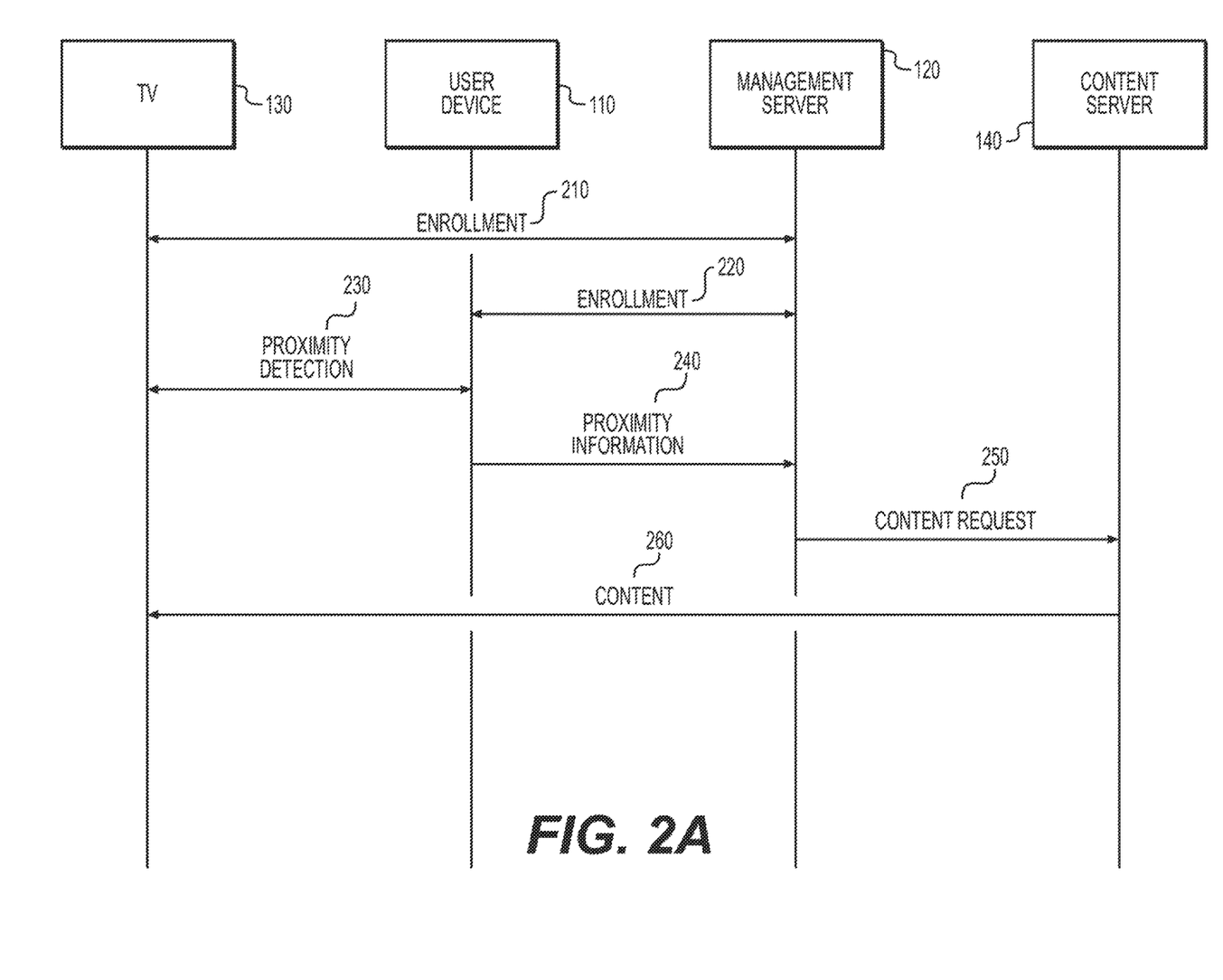
FIG. 2A is a flowchart showing exemplary stages for displaying contextual enterprise content based on proximity information provided by a user device.
Figure 2B:
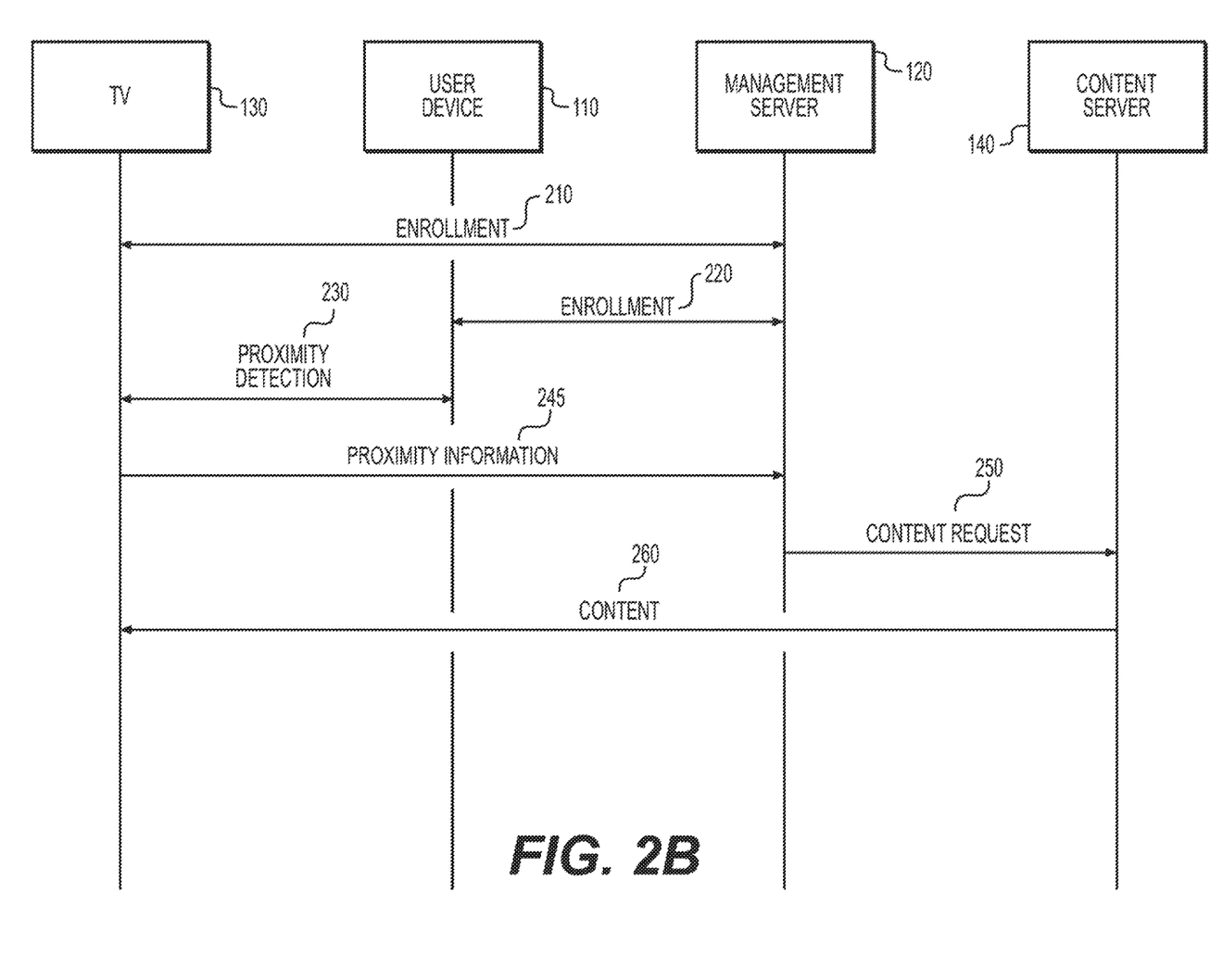
FIG. 2B is a flowchart showing exemplary stages for displaying contextual enterprise content based on proximity information provided by a television.
Figure 2C:
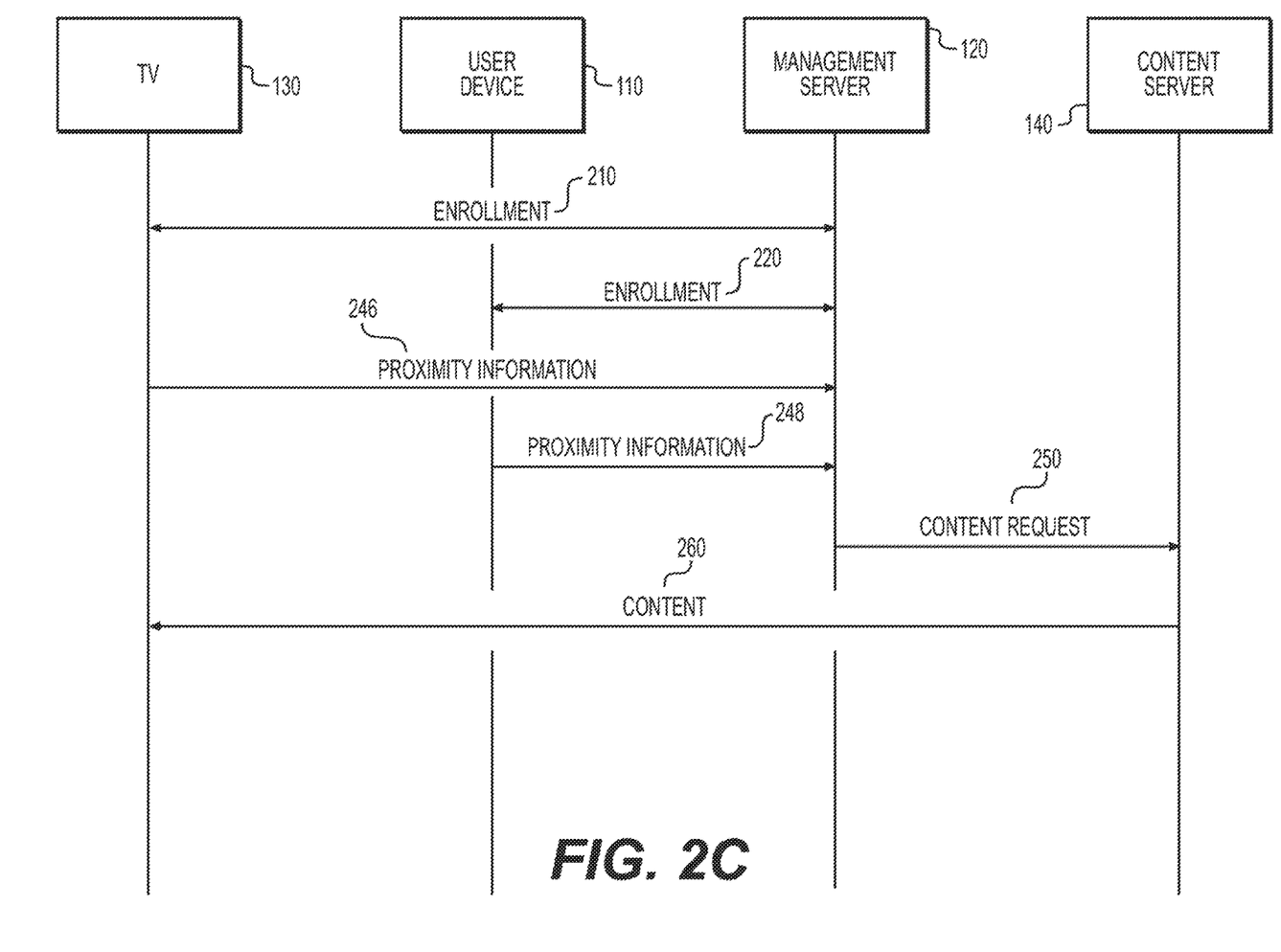
FIG. 2C is a flowchart showing exemplary stages for displaying contextual enterprise content based on proximity information provided by both a television and a user device.

FIGS. 2A-C provide flowcharts of example stages for displaying contextual enterprise content. Each of FIGS. 2A-C illustrates a different example method of providing and utilizing proximity information from either the user device 110, television 130, or both. Turning to FIG. 2A, stage 210 can include an enrollment process between the television 130 and management server 120. For example, enrollment can include exchanging communications between the television 130 and the enrollment component, administrator component, or both, as discussed above with respect to FIG. 1. Enrollment can also include a stage of causing a management agent 132 to be installed on the television 130. In some examples, the television 130 can be preconfigured to automatically enroll with the management server 120. For example, the television 130 can be preconfigured with a token that indicates to the management server 120 that the television 130 is approved for enrollment at stage 210.

At stage 220, the user device 110 can be enrolled with the management server 120. Although stage 220 is shown occurring after stage 210, it can be performed before stage 210. For example, a user device 110 can be enrolled at stage 220 when a user first joins an enterprise. The enrollment process can include exchanging communications between the user device 110 and the enrollment component, administrator component, or both, as discussed above with respect to FIG. 1. Enrollment can also include a stage of causing a management agent 132 to be installed on the user device 110.

At stage 230, proximity detection can occur between the television 130 and the user device 110. In the example shown in FIG. 2A, the user device 110 can detect the proximity of the television 130 by recognizing one or more NFC components of the television 130. Because the television 130 includes a management agent 132, the NFC signals from the television 130 can be tailored in a manner that assists the user device 110 in recognizing the presence and distance of the television 130 from the user device 110. For example, the television 130 can detect the user device 110 and broadcast an alternate NFC signal when the user device 110 is within a threshold distance.

At stage 240, the user device 110 can transmit proximity information to the management server 120. For example, the management agent 132 of the user device 110 can transmit a message to the management server 120 indicating that the user device 110 is within range of an NFC component of the television 130. The proximity information can include the type of NFC component detected, the time of detection, the duration of detection, the estimated physical distance between the respective NFC components of the television 130 and user device 110, and other relevant information. The proximity information can also include contextual information, such as whether the user device 110 is currently in use, the battery level of the user device 110, whether the user is currently logged into an enterprise application, and so on.

At stage 250, the management server 120 can send a content request to the content server 140. In one example, the content request includes a request for a particular content item. For example, the management server 120 can request a particular presentation that the user is likely to want to display on the television 130. The management server 120 can use a variety of methods to determine which presentation a user is likely to want to display. In one example, the management server 120 can access calendar data from ACTIVE DIRECTORY to determine the subject matter of an upcoming meeting. The management server 120 can also determine which television 130 is in the meeting room. Based on the user being in proximity of the television 130 in the meeting room, the management server 120 can search for relevant files. For example, the management server 120 can parse files stored through CONTENT LOCKER and search for terms that match the subject matter of the meeting. The management server 120 can also take into account the date the file was created and the date the file was last edited, such that the newest and most relevant version is selected. The management server 120 can also consider the file type. For example, a user is more likely to prefer displaying a PowerPoint file than a PDF.

In another example, the content request provides an relevant proximity information and associated contextual information, along with a request for the content server 140 to determine appropriate content to display on the television 130. The content server 140 can analyze the information according to one or more content rules and select appropriate content for display.

At stage 260, the content server 140 can transmit content to the television 130 for display. This stage can also include sending the content from the content server 140 to the management server 120, and then to the television 130. The content selected to be transmitted to the television 130 can be selected based on one or more content rules. For example, a content rule can specify that a particular television 130 only displays advertising content. In that case, the content server 140 will deliver to the television 130 one or more advertisements in the form of photos, presentations, videos, or others. The content server 140 can select appropriate advertisements based on the proximity information and any other context information provided by the user device 110 or management server 120. In other examples, content rules can specify a tendency toward displaying presentations, calendar reminders, or any other type of enterprise information. In some examples, the content server 140 can select content based on the status of the space surrounding the television 130. For example, the content server 140 can consider whether the television 130 is located in a public space or a private space. If the television 130 is located in a public space, such as a lobby of a building, a content rule can specify that the content server 140 not serve any confidential enterprise data to that television 130. On the other hand, if a television 130 is located in a meeting room in the legal department of the enterprise, the content server 140 can send relevant, confidential enterprise data to that television 130.

FIG. 2B provides another example flowchart for displaying contextual enterprise content. Stages 210 and 220 of FIG. 2B are similar to the likewise-numbered stages of FIG. 2A, discussed above. That is, stage 210 can include an enrollment process between the television 130 and management server 120, while stage 220 can include an enrollment process between the user device 110 and management server 120. In both stages 210 and 220, enrollment can include causing management agents 132 to be installed on the television 130 and user device 110, respectively. Stages 210 and 220 can include exchanging communications between the user device 110 or television 130 and the enrollment and administrator components of the management server 120.

At stage 230, proximity detection can occur between the television 130 and the user device 110. In the example shown in FIG. 2B, the television 130 can detect the proximity of the user device 110 by recognizing one or more NFC components of the user device. The NFC signals from the user device 110 can be tailored in a manner that assists the television 130 in recognizing the presence and distance of the user device 110 from the television 130. For example, the user device 110 can detect the television 130 and broadcast an alternate NFC signal when the television 130 is within a threshold distance.

At stage 245, the television 130 can transmit proximity information to the management server 120. For example, the management agent 132 of the television 130 can transmit a message to the management server 120 indicating that the television 130 is within range of an NFC component of the user device 110. The proximity information can include the type of NFC component detected, the time of detection, the duration of detection, the estimated physical distance between the respective NFC components of the television 130 and user device 110, and other relevant information. The proximity information can also include contextual information, such as whether the television 130 is currently in use, the number of other televisions 130 or user devices 110 nearby, and any other useful contextual information.

In one example, the management agents 132 of the television 130 and user device 110 can determine that a threshold proximity condition has been met. In response, the user device 110 or television 130 can request content from the management server 120 or content server 140. For the purposes of this disclosure, the content request itself can serve as the proximity information. The request itself can indicate that the devices 110 and 130 meet a proximity condition, and the management server 120 need not make any further determinations about the proximity before supplying the content, in one example.

At stage 250, the management server 120 can send a content request to the content server 140. In one example, the content request includes a request for a particular content item. For example, the management server 120 can request a particular presentation that the user is likely to want to display on the television 130. For example, the management server 120 can select a presentation file that is relevant to the subject matter of a meeting request associated with a meeting in the room where the television 130 is located. In another example, the management server 120 can select a file that the user has marked as available for sharing to a television 130. In yet another example, the content request provides any relevant proximity information and associated contextual information, along with a request for the content server 140 to determine appropriate content to display on the television 130. The content server 140 can analyze the information according to one or more content rules and select appropriate content for display. As described above, a content rule can be any rule that affects the selection of content to be sent to a television 130. For example, a content rule can specify the type of content to be displayed on a television 130, the method for selecting content, restrictions for particular televisions 130, a proximity range for a television 130, and a list of users eligible for sharing content on a television 130.

At stage 260, the content server 140 can transmit content to the television 130 for display. This stage can also include sending the content from the content server 140 to the management server 120, and then to the television 130. The content selected to be transmitted to the television 130 can be selected based on one or more content rules, as explained above with respect to FIGS. 1 and 2A.

FIG. 2C provides another example flowchart for displaying contextual enterprise content. Stages 210 and 220 of FIG. 2C are similar to the likewise-numbered stages of FIGS. 2A and 2B, discussed above. That is, stage 210 can include an enrollment process between the television 130 and management server 120, while stage 220 can include an enrollment process between the user device 110 and management server 120. In both stages 210 and 220, enrollment can include causing management agents 132 to be installed on the television 130 and user device 110, respectively. Stages 210 and 220 can include exchanging communications between the user device 110 or television 130 and the enrollment and administrator components of the management server 120.

At stage 246, the television 130 can transmit proximity information to the management server 120. In the example of FIG. 2C, the proximity information can be based on the television's 130 proximity to a device other than the user device 110—for example, a beacon 150 located near the television 130. The management agent 132 of the television 130 can transmit a message to the management server 120 indicating that the television 130 is within range of an NFC component such as a beacon 150. The proximity information can also include contextual information, such as whether the television 130 is currently in use, the number of other televisions 130 or user devices 110 nearby, and any other useful contextual information.

Similarly, at stage 248, the user device 110 can transmit proximity information to the management server 120 as well. In the example of FIG. 2C, the proximity information can be based on the user device's 110 proximity to a device other than the television 130, such as a beacon 150. The management agent 132 of the television 130 can transmit a message to the management server 120 indicating that the user device 110 is within range of an NFC component such as a beacon 150. The proximity information can also include contextual information, such as whether the user device 110 is currently in use, the battery level of the user device 110, and whether the user is currently logged into an enterprise application.

The management server 120 can compare the proximity information received at stages 246 and 248 from the television 130 and user device 110, respectively, to determine whether the two are close enough to share content. For example, the management server 120 can enforce a content rule that requires both the television 130 and user device 110 to be within three feet—or any other distance—from the same beacon 150. If the management server 120 determines that content should be displayed on the television 130, it can send a content request at stage 250.

In one example, the content request includes a request for a particular content item. For example, the management server 120 can request a particular presentation that the user is likely to want to display on the television 130. In another example, the content request provides any relevant proximity information and associated contextual information, along with a request for the content server 140 to determine appropriate content to display on the television 130. The content server 140 can analyze the information according to one or more content rules and select appropriate content for display.

At stage 260, the content server 140 can transmit content to the television 130 for display. This stage can also include sending the content from the content server 140 to the management server 120, and then to the television 130. The content selected to be transmitted to the television 130 can be selected based on one or more content rules, as explained above with respect to FIGS. 1, 2A, and 2B.

Figure 3A:
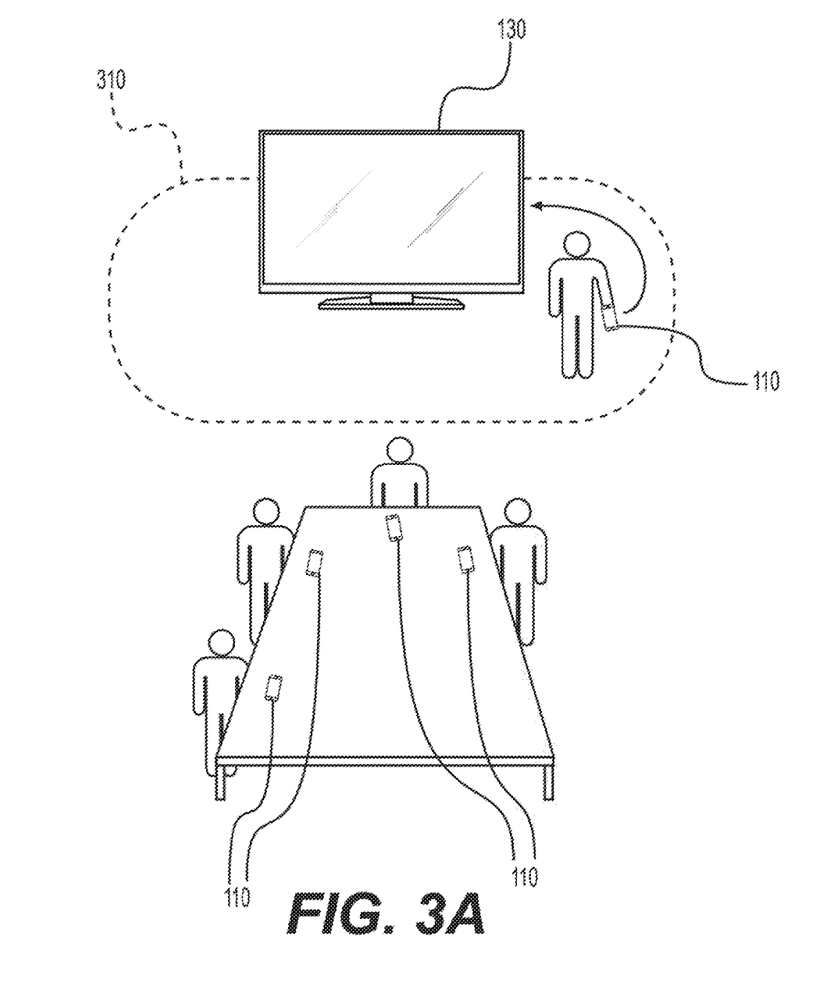
FIG. 3A is an illustration of an example use case where a television displays content based on a user device being within proximity of the television.

FIG. 3A provides an illustration of an exemplary use case where a television 130 displays content based on a user device 110 being within proximity of the television 130. FIG. 3A depicts a conference area with a conference table, conference attendees, and a user standing near the television 130. The user is holding a user device 110. Both the user and the user device 110 are within a proximity area 310 surround the television 130. The proximity area 310 is only pictured for illustration purposes and would not physically appear in conjunction with the television 130.

In this example, the user device 110 within the proximity area 310 can trigger the television 130, user device 110, or both to transmit proximity information to the management server 120. For example, the management agent 132 of the user device 110 can transmit a message to the management server 120 indicating that the user device 110 is within range of an NFC component of the television 130, or vice versa. The proximity information can include the type of NFC component detected, the time of detection, the duration of detection, the estimated physical distance between the respective NFC components of the television 130 and user device 110, and other relevant information. The proximity information can also include contextual information, such as whether the user device 110 or television 130 are currently in use, the battery level of the user device 110, and whether the user is currently logged into an enterprise application.

For example, the management server 120 can access information indicating that the user is currently logged into a managed application. The management server 120 can obtain this information from a management agent 132 on the device 110, or from a server running or supporting the managed application. For example, a user can be logged into a managed application that provides secure access to enterprise files, such as CONTENT LOCKER, or a project-management application such as JIRA or CONFLUENCE. The management server 120 can detect that the user is logged into that application, and can also detect which file the user is currently accessing. In an example where the user is accessing a file in a managed application while the user and user device 110 enter the proximity area 310 of the television 130, the management server 120 or content server 140 can choose to display that same file on the television 130.

In the example described above, the management server 120 can utilize tokens associated with a user device 110 to access information or content across a variety of applications. For example, the management server 120 can store single-sign-on information for a user device 110 into various applications, such as JIRA and CONFLUENCE. The management server 120 can use a token issued to a user device 110 for use with one of those applications to gain access to personalized information through those applications. The management server 120 can also provide the token to the content server 140 to allow the content server to gain similar access. The content server 140 can use this access to select content from an enterprise application and cause it to be displayed on a relevant television 130.

As a result of the user device 110 being within the proximity area 310 of the television 130, the content server 140 can send content to be displayed on the television 130. The content selected to be transmitted to the television 130 can be selected based on one or more content rules. In some examples, the content server 140 or management server 120 can provide the user with an opportunity to approve the content selected by the content server 140 before it is displayed on the television 130. The arrow between the user device 110 and the television 130 in FIG. 3A does not necessarily indicate a direct transfer of information between the two; rather it merely represents the fact that the proximity of the user device 110 causes content to be displayed on the television 130.

Figure 3B:
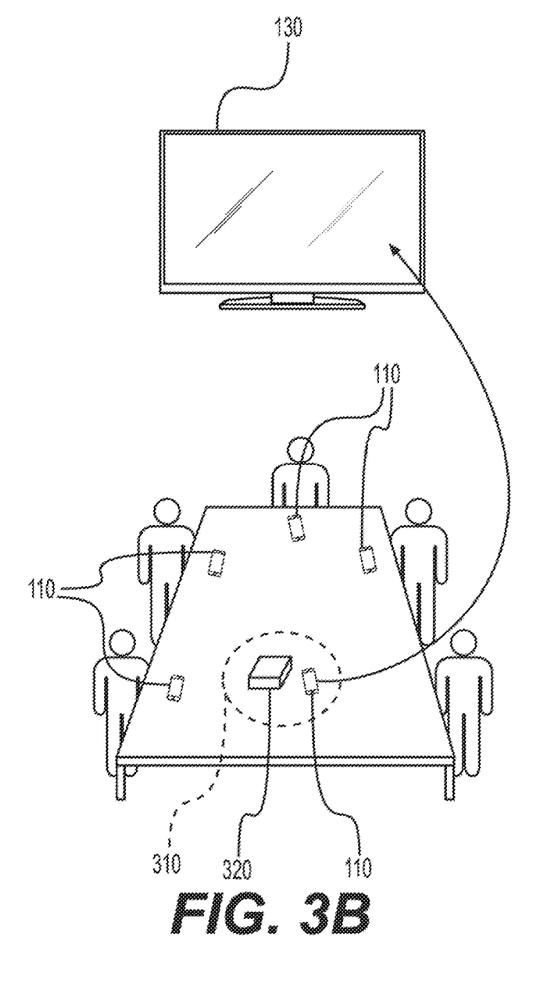
FIG. 3B is an illustration of an example use case where a television displays content based on a user device being within proximity of a set-top box associated with the television.

FIG. 3B provides an illustration of an exemplary use case where a television 130 displays content based on a user device 110 being within proximity of a component 320 of the television 130. The component 320 of the television 130 can be, for example, a projector, a set-top box or streaming device, or a sensor associated with the television 130. FIG. 3B depicts a conference area with a conference table, conference attendees, and a user that has placed his or her user device 110 within a proximity area 310 of the component 320. Contrasted with the proximity area 310 in FIG. 3A, the proximity area 310 in FIG. 3B is considerably smaller. This is because the proximity area 310 in FIG. 3B is located on the conference table, while the proximity area 310 in FIG. 3A surrounds the television 130. As shown in FIG. 3B, multiple user devices 110 might be within range of the component 320. However, a user would still need to place their user device 110 within the smaller proximity area 310 to enable relevant content to be delivered to the television 130.

In this example, the user device 110 within the proximity area 310 can trigger the television 130, component 320, user device 110, or any combination thereof to transmit proximity information to the management server 120. For example, the management agent 132 of the user device 110 can transmit a message to the management server 120 indicating that the user device 110 is within range of the component 320 of the television 130, or vice versa. The proximity information can include the type of NFC component detected, the time of detection, the duration of detection, the estimated physical distance between the component 320 and user device 110, and other relevant information. The proximity information can also include contextual information, such as whether the user device 110 or television 130 are currently in use, the battery level of the user device 110, and whether the user is currently logged into an enterprise application.

As a result of the user device 110 being within the proximity area 310 of the component 320 of the television 130, the content server 140 can send content to be displayed on the television 130. The content selected to be transmitted to the television 130 can be selected based on one or more content rules. In some examples, the content server 140 or management server 120 can provide the user with an opportunity to approve the content selected by the content server 140 before it is displayed on the television 130. The arrow between the user device 110 and the television 130 in FIG. 3B does not necessarily indicate a direct transfer of information between the two; rather it merely represents the fact that the proximity of the user device 110 causes content to be displayed on the television 130.

FIGS. 3A and 3B show examples where only one user device 110 is within a proximity area 310 of a television 130. However, in some examples, more than one user device 110 can be within a proximity area 310. Various options can be implemented to determine which content to display on the television 130 in that scenario. In one example, content is selected based on the closest user device 110 without regard for other user devices in the area 110. In another example, content is selected based the closest user device 110 and the surrounding devices 110.

For example, a television 130 in a conference room can have a proximity area 310 that encompasses the entire conference room. When multiple devices 110 are detected, the management server 120 can confirm that the group of devices 110 are intended to be in the same meeting. For example, the management server 120 can access ACTIVE DIRECTORY to determine that each of those devices 110 has a meeting scheduled that matches the meetings scheduled on the other devices 110 in the room. By confirming that all of the user devices 110 are attending the same meeting, the management server 120 provides an additional security layer. For example, when one meeting ends and another is set to begin at the same time, the meeting room can include a mixture of people and devices 110 in the room for different purposes. One group can be an executive group while the other group is an accounting group, for example. In this scenario, the television 130 should not display content because the meeting room is soil turning over from one meeting to another. The management server 120 can compare data relating to the user devices 110 in the room to determine whether the intended audience is in the room before continuing. If confidential content is intended to be displayed on the television 130, the management server 120 can prevent content from being displayed until only authorized users are present in the room.

When multiple user devices 110 are within the proximity area 310 of a television 130, the management server 120 can select the most appropriate user device 110 upon which to base the content selection. In one example, the management server 120 can access enterprise information, such as information in a meeting request, to determine the presenting user for a meeting. In that example, the management server 120 can cause that user's device 110 to display content on the television 130 even if that device 110 is not the closest to the television 130. In another example, the management server 120 can prompt the closest user device 110 and ask whether the user would like to share content on the television 130. In yet another example, the management server 120 can search for tagged information on the nearby devices 110, indicating that a user intends to share content on the television 130 by having tagged that content in advance.

In another example, a television 130 in a larger area such as a cafeteria or break room can have a larger proximity area 310 that captures a large number of user devices 110 in the area. In that example, because the television 130 is not intended for a specific purpose, such as displaying a presentation during a meeting, the management server 120 can select content based on its relevance to the largest number of users in the area. For example, a cafeteria can have several televisions 130. Nearby one television 130, a group of developers can be at a table eating. The management server 120 can detect that the closest group of user devices 110 belong to users in a developer organizational group, and can therefore decide to display content relevant to that group. For example, the content server 140 can send content to the television 130 reminding the developers of a group-wide meeting occurring later in the day. If other user devices 110 are in the area, even if further away, the management server 120 can ensure that no confidential information is displayed on the television 130.

In another example, a television 130 in a larger area such as a cafeteria or break room can have a proximity area 310 that captures a large number of user devices 110 in the area. In that example, the management server 120 can recognize a diverse group of users in the area, such that no specific meeting reminders or other individual-user-based information is appropriate for display. As a result, the management server 120 can request generic enterprise content from the content server 140, such as promotional content for the enterprise itself, a reminder about upcoming holidays, or other content applicable to the overall group of users in the area. In another example, the management server 120 can request advertising content to be displayed on the television 130.

In some examples, a user device 110 can pass through a proximity area 310 of a television 130 and spend only a limited amount of time inside the proximity area 310. In most cases, a user would not want to display content on a television 130 simply from walking by the television 130. As a result, a time element can be built into the determination, by the management server 120 or content server 140, to avoid accidentally displaying content on a television 130. The time element can be customized for different televisions 130 and user devices 110. In one example, a television 130 in a conference room can require a user device 110 to be within proximity of the television 130 for at least 20 seconds before the content server 140 delivers content to the television 130, or prompts the user with an option to deliver content to the television 130. In another example, a television 130 in a hallway can be configured to display a relevant advertisement as soon as a user device 110 is detected, such that the user will view the advertisement as they walk by. These settings can be configured by an administrator through a console, and can be customized for individual televisions 130 or users.

Figure 4:
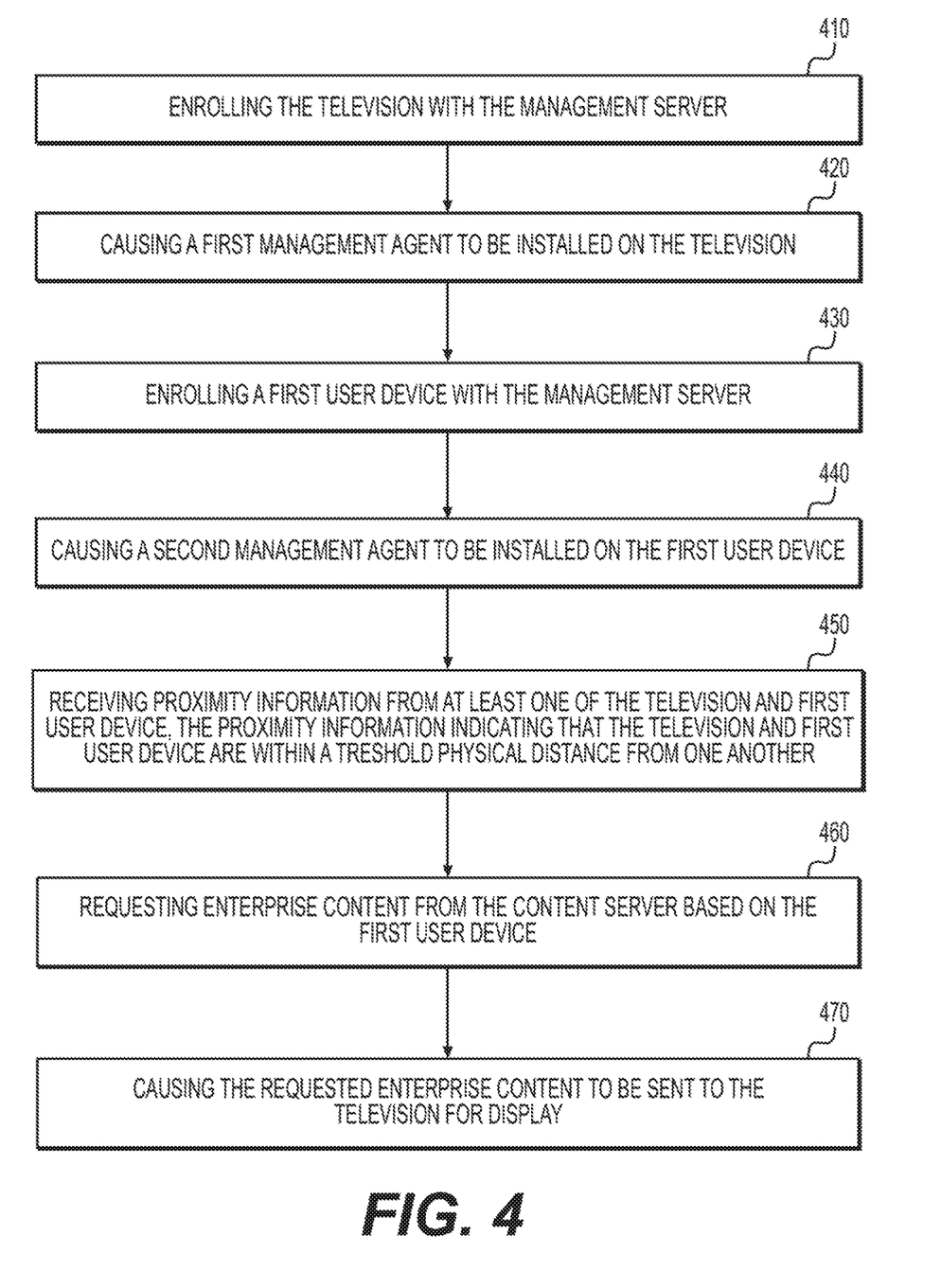
FIG. 4 is a flowchart of an exemplary method for displaying contextual enterprise content based on proximity.

FIG. 4 provides a flowchart of an example method for displaying contextual enterprise content based on proximity. Stage 410 can include enrolling a television 130 with the management server 120. Enrollment can include, for example, exchanging communications between the television 130 and the enrollment component, administrator component, or both, as discussed above with respect to FIG. 1. In some examples, the television 130 can be preconfigured to automatically enroll with the management server 120. For example, the television 130 can be preconfigured with a token that indicates to the management server 120 that the television 130 approved for enrollment.

Stage 420 can include causing a first management gent 132 to be installed on the television 130. This stage can be carried out as part of the enrollment process in stage 410, or as a separate stage. The management agent 132 can be a dedicated application or other software installed the television 130 that can monitor and manage data, software components, and hardware components associated with the television 130. The management agent 132 can monitor and control functionality and other managed applications on the television 130 as well. The management agent 132 can also communicate directly with the management server 120 and carry out instructions provided by management server 120.

Stage 430 can include enrolling a first user device 110 with the management server 120. Enrollment can include, for example, exchanging communications between the first user device 110 and the enrollment component, administrator component, or both, as discussed above with respect to FIG. 1. Stage 430 can occur before or after either of stages 410 and 420, as the user can enroll their user device 110 for purposes outside of the context of providing content to a television 130.

Stage 440 can include causing a second management agent 132 to be installed on the first user device 110. As with stage 430, stage 440 can be carried out before or after either of stages 410 and 420. In addition, stage 440 can be carried out as part of, or in conjunction with, the enrollment process at stage 430. The management agent 132 can be a dedicated application or other software installed on the user device 110 that can monitor and manage data, software components, and hardware components associated with the user device 110. The management agent 132 can monitor and control functionality and other managed applications on the television 130 as well. The management agent 132 can also communicate directly with the management server 120 and carry out instructions provided by the management server 120.

Stage 450 can include receiving proximity information from at least of the television 130 and first user device 110, indicating that the television 130 and first user device 110 are within a threshold physical distance from one another. The proximity information can be received at the management server 120, the content server 140, or both. Proximity information can include any type of information providing an indication of the physical locations of the first user device 110 or television 130. For example, proximity information can include information generated by an NFC component of the user device 110 or television 130 based on detecting another NFC component, such as a beacon 150 or a component within the first user device 110 or television 130. The proximity distance can indicate that the first user device 110 and television 130 are within a threshold physical distance from one another.

In one example, the user device 110 and management server 120 determine proximity without first contacting the management server 120. Then, they send proximity information to the management server 120 by requesting content based on the determined proximity. The management server 120 need not actually determine the proximity before providing content. Instead, the proximity information can include an indication that the management agents 132 of the television 130 and user device 110 have determined that the meet a threshold proximity condition.

Stage 460 can include requesting enterprise content from the content server 140 based on the first user device 110. The management server 120 can send a content request to the content server 140. In one example, the content request includes a request for a particular content item. For example, the management server 120 can request a particular presentation that the user is likely to want to display on the television 130. In another example, the content request provides any relevant proximity information and associated contextual information, along with a request for the content server 140 to determine appropriate content to display on the television 130. The content server 140 can analyze the information according to one or more content rules and select appropriate content for display.

Stage 470 can include causing the requested enterprise content to be sent to the television 130 for display. The content selected to be transmitted to the television 130 can be selected based on one or more content rules set forth by the management server 120. This stage can also include sending the content from the content server 140 to the management server 120, and then from the management server 120 to the television 130.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A proximity-based system for displaying contextual enterprise content on a television, comprising:
   a content server that stores enterprise content; and
   a management server comprising a processor that executes instructions on a non-transitory, computer-readable medium to perform stages, the stages comprising:
   enrolling the television with the management server;
   causing a first management agent to be installed on the television;
   enrolling a first user device and a second user device with the management server;
   causing a second management agent to be installed on the first user device and a third management agent to be installed on the second user device;
   receiving, from the first management agent installed on the television, first proximity information of the television;
   receiving, from the second management agent installed on the first user device, second proximity information of the first user device;
   receiving, from the third management agent installed on the second user device, third proximity information of the second user device;
   determining, based on the first, second, and third proximity information, which of the first user device and second user device is closer to the television;
   requesting enterprise content from the content server based on the determination of which of the first user device and second user device is closer to the television; and
   causing the requested enterprise content to be sent to the television for display,
   wherein the enterprise content is requested by the management server based on determining, at the management server, that at least one of the first user device and second user device is currently utilizing an application managed by the management server, the application being distinct from the first management agent.

2. The system of claim 1, wherein the stages performed by the management server further comprise:
   requesting additional enterprise content from the content server based on the first user device and second user device being within a threshold physical distance from the device; and
   causing the requested additional enterprise content to be sent to the television for display.

3. The system of claim 1, wherein a user of the first user device can flag content to prevent the flagged content from being automatically displayed on the television.

4. The system of claim 1, wherein the requested enterprise content is a file being accessed at the first user device through the managed application.

5. The system of claim 1, wherein the stages performed by the management server further comprise: requesting advertising content from the content server, wherein the advertising content is based on the enterprise content.

6. A method for displaying contextual enterprise content based on proximity, comprising:
   enrolling a television with a management server;
   causing a first management agent to be installed on the television;
   enrolling a first user device and a second user device with the management server;
   causing a second management agent to be installed on the first user device and a third management agent to be installed on the second user device;
   receiving, from the first management agent installed on the television, first proximity information of the television;
   receiving, from the second management agent installed on the first user device, second proximity information of the first user device;
   receiving, from the third management agent installed on the second user device, third proximity information of the second user device;
   determining, based on the first, second, and third proximity information, which of the first user device and second user device is closer to the television;
   requesting enterprise content from a content server based on the determination of which of the first user device and second user device is closer to the television; and
   causing the requested enterprise content to be sent to the television for display,
   wherein the enterprise content is requested by the management server based on determining, at the management server, that at least one of the first user device and second user device is currently utilizing an application managed by the management server, the application being distinct from the first management agent.

7. The method of claim 6, further comprising:
   requesting additional enterprise content from the content server based on the first user device and second user device being within a threshold physical distance from the device; and
   causing the requested additional enterprise content to be sent to the television for display.

8. The method of claim 7, wherein the first management agent of the television determines which of the first user device and second user device is closer to the television, and sends the enterprise content request to the management server based on that determination.

9. The method of claim 6, wherein a user of the first user device can flag content to prevent the flagged content from being automatically displayed on the television.

10. The method of claim 6, wherein the requested enterprise content is a file being accessed at the first user device through the managed application.

11. The method of claim 6, further comprising requesting advertising content from the content server, wherein the advertising content is based on the enterprise content based on the first user device.

12. A non-transitory, computer-readable medium containing instructions that, when executed by a processor of a management server, performs stages for displaying contextual enterprise content based on proximity, the stages comprising:

enrolling a television with the management server;

causing a first management agent to be installed on the television;

enrolling a first user device and a second user device with the management server;

causing a second management agent to be installed on the first user device and a third management agent to be installed on the second user device;

receiving, from the first management agent installed on the television, first proximity information of the television;

receiving, from the second management agent installed on the first user device, second proximity information of the first user device;

receiving, from the third management agent installed on the second user device, third proximity information of the second user device;

determining, based on the first, second, and third proximity information, which of the first user device and second user device is closer to the television;

requesting enterprise content from a content server based on the determination of which of the first user device and second user device is closer to the television; and causing the requested enterprise content to be sent to the television to for display, wherein the enterprise content is requested by the management server based on determining, at the management server, that at least one of the first user device and second user device is currently utilizing an application managed by the management server, the application being distinct from the first management agent.

13. The non-transitory, computer-readable medium of claim 12, wherein the stages performed by the management server further comprise:

requesting additional enterprise content from the content server based on the first user device and second user device being within a threshold physical distance from the device; and causing the requested additional enterprise content to be sent to the television for display.

14. The non-transitory, computer-readable medium of claim 12, wherein a user of the first user device can flag content to prevent the flagged content from being automatically displayed on the television.

15. The non-transitory, computer-readable medium of claim 12, wherein proximity information comprises information indicating a distance between the first user device and a beacon associated with the television.

16. The non-transitory, computer-readable medium of claim 12, wherein proximity information comprises information indicating a distance between the television and first user device based on detecting a wireless-internet receiver in the first user device.

* * * * *